May 23, 1967
D. C. SCHLUDERBERG
3,321,377
NUCLEAR REACTOR POWER PLANT ARRANGEMENT
Filed Sept. 8, 1965
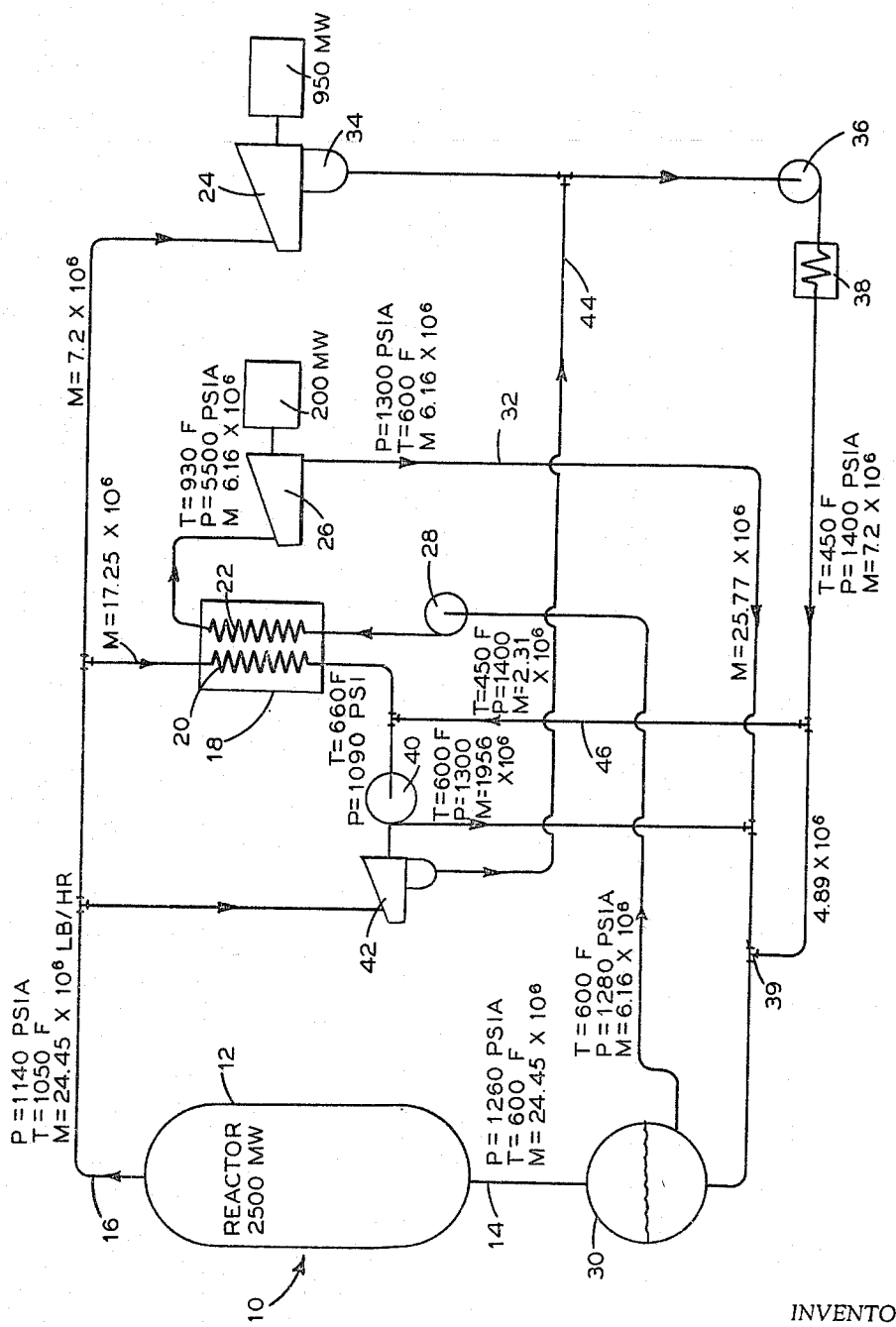
INVENTOR.
Donald C. Schluderberg
BY
*J.P. Moran*
ATTORNEY United States Patent Office 3,321,377
Patented May 23, 1967

3,321,377
NUCLEAR REACTOR POWER PLANT
ARRANGEMENT
Donald C. Schluderberg, Lynchburg, Va., assignor to The Babcock & Wilcox Company, New York, N.Y., a corporation of New Jersey
Filed Sept. 8, 1965, Ser. No. 485,849
14 Claims. (Cl. 176—60)

The present invention relates in general to a nuclear reactor power plant arrangement and to a method of operating the same, and more specifically to a vapor cooled fast breeder reactor system in which the cycle efficiency is maximized while at the same time reactor fuel costs and fuel breeding ratios are optimized.

The present invention is directed to a reactor power plant system arranged to operate with a fast breeder reactor utilizing a gas or vapor such as steam as the coolant fluid. The coolant is circulated through the reactor where it is heated at a relatively low pressure and a portion of the heated fluid is then passed through a low pressure turbine where work is extracted therefrom. The remainder of the fluid leaving the reactor is passed through a heat exchanger giving up heat to a high pressure fluid which is then expanded through a high pressure turbine.

In nuclear reactor systems of the prior art, utilizing a steam-cooled fast breeder reactor, supercritical pressure cycles have been proposed in the belief that the cycle efficiency would be maximized thereby. However, with further development of the steam-cooled fast breeder reactor it has been found that desirable breeding ratios and economic fuel costs are relatively difficult to achieve utilizing steam as the coolant at supercritical pressures. It has, however, been found that breeding ratios and fuel costs may be optimized in such steam-cooled fast breeder reactors utilizing steam as the coolant at approximately 1200 p.s.i. Utilizing such relatively low pressure coolant, as compared to supercritical pressures of above 3200 p.s.i., breeding ratios between 1.3 and 1.5 may be achieved with very economic fuel costs of between 0.5 and 1.0 mil per kilowatt-hour. However, it has been found that, in reducing the reactor coolant pressure from the supercritical range to approximately 1200 p.s.i., the system efficiency is reduced by five to six percent which, in turn, counteracts the breeding and fuel cost savings realized by the reduction in operating pressure.

Accordingly, the present invention provides a nuclear reactor system in which a fast breeder reactor is operated with steam at a pressure of approximately 1200 p.s.i. as the coolant, achieving desirable reactor fuel costs and breeding ratios, while at the same time providing a cycle efficiency approaching that possible with a supercritical pressure system. Thus, the present invention provides a vapor cooled fast breeder reactor system in which a relatively low pressure vapor is passed through the reactor removing heat therefrom, and possibly acting as a reactivity regulator as disclosed in applicant's copending application Ser. No. 261,627, filed Feb. 28, 1963, now Patent No. 3,247,068. A portion of the heated coolant leaving the reactor is then expanded through a relatively low pressure condensing turbine producing useful power. A major portion of the coolant is passed through the primary portion of a heat exchanger giving up heat to a fluid at or above the critical pressure passing in indirect heat transfer contact therewith in a secondary portion of the heat exchanger. The heated high pressure fluid is then expanded through a high pressure turbine. The exhaust from the two turbines and the primary portion of the heat exchanger are then combined and the major portion thereof is vaporized for introduction into the inlet of the reactor. The remaining liquid portion is then pressurized for introduction into the secondary, high pressure portion of the heat exchanger.

Furthermore, the present invention provides a nuclear reactor system wherein the portion of the coolant entering the reactor may be vaporized by the uncondensed exhaust from the high pressure turbine.

The reactor system of the present invention also provides for the introduction of a portion of the condensate from the relatively low pressure condensing turbine into the inlet of the main circulating pump to increase the efficiency thereof.

It should be noted that while steam is normally referred to as the preferred coolant for the reactor system of the present invention, any hydrogen bearing fluid capable of being vaporized and condensed may be used. These may include, but are not limited to water or hydrocarbons.

The accompanying drawing is a schematic illustration of a reactor system incorporating the present invention. A nuclear reactor, generally indicated at 10, comprises a vertically elongated cylindrical pressure vessel 12 and may have an inlet 14 in the lower end thereof and an outlet 16 in the upper end thereof. The internals of the reactor may be constructed in any manner well known in the art. A heat exchanger 18 is provided having a primary portion 20 and a secondary portion 22 arranged for indirect heat transfer relationship between the fluids contained in the two portions. The inlet of the primary portion 20 is connected to the outlet 16 of the reactor and is arranged for the flow of a major portion of the heated reactor coolant fluid therethrough. Substantially all of the remaining fluid from the reactor outlet 16 is introduced into the inlet of turbine 24 which is arranged to be operated with an inlet pressure substantially equal to the outlet pressure of the reactor 10.

A second, high pressure turbine 26 is arranged in the system and receives high pressure operating fluid from the outlet of the secondary portion 22 of the heat exchanger 18. This secondary portion 22 is supplied with fluid by a high pressure pump 28 from a steam drum 30 which is connected to the inlet 14 of the reactor in a manner which will be further described hereinbelow. The outlet 32 from the high pressure turbine 26 is returned directly to the steam drum 30. The outlet fluid from the low pressure turbine 24 is condensed in condenser 34 and the pressure of the condensate is raised by feedwater pump 36 before passing through feedwater heaters 38 is a manner well known in the art. After leaving feedwater heaters 38, the condensate is mixed via T 39 with the high pressure turbine exhaust in line 32 for introduction into the steam drum 30. The outlet on the primary portion 20 of the heat exchanger 18 is connected to a main circulating pump 40 which also discharges into line 32 from the high pressure turbine. The main circulating pump 40 may be driven by a turbine 42 which obtains driving fluid from the outlet line 16 of the reactor and discharges the condensate via line 44 into the outlet from condenser 34 of the low pressure turbine 24. A small portion of the feedwater from heater 38 may be introduced via line 46 into the inlet of the main criculating pump 40.

In operation the reactor 10 is provided with a hydrogen-bearing vaporous coolant capable of being condensed, steam in this example, through inlet line 14. The steam may be saturated at a pressure of approximately 1260 p.s.i. The heated coolant leaving the reactor via line 16 may be at a pressure of approximately 1140 p.s.i. and a temperature of 1050° F. Approximately 30% of the outlet coolant is introduced into turbine 24 operating at a pressure of approximately 1140 p.s.i. through which it is expanded, the exhaust fluid being condensed in condenser 34 in a manner well known in the art. Approximately 70% of the reactor outlet coolant is passed through the primary portion 20 of the heat exchanger 18 wherein the temperature is reduced from approximately 1050° F.

to approximately 660° F. giving up heat to the fluid in the secondary portion 22 of the heat exchanger. Pump 40 then raises the pressure of the fluid leaving the heat exchanger from about 1090 p.s.i. to approximately 1300 p.s.i. for introduction into steam drum 30. The steam drum permits the separation of vapor from the liquid, which vapor is then introduced into the reactor via line 14.

The pressure of the saturated liquid separated in the steam drum 30 is raised by high pressure pump 28 from approximately 1280 p.s.i. to 6000 p.s.i. for passage through the secondary portion of the heat exchanger where it is heated from 600° F. to 930° F. by the portion of the heated reactor outlet coolant passing through the primary portion 20 of the heat exchanger. The supercritical pressure steam leaving the secondary portion of the heat exchanger is then introduced into the high pressure turbine 26 at approximately 5500 p.s.i. The high pressure turbine 26 then exhausts to line 32 at a pressure of approximately 1300 p.s.i. for reintroduction into the steam drum 30.

The condensate from turbines 24 and 42 is mixed with the vapor from the outlet of the high pressure turbine 26 so that a major portion of the fluid entering steam drum 30 may be separated as vapor for introduction into the reactor inlet 14 as the reactor coolant fluid. The separated liquid then supplies pump 28.

With the reactor system of the present invention, saturated steam at a pressure of approximately 1200 p.s.i. is introduced into the reactor as the coolant with the resultant improvement in breeding ratio and the relatively low fuel cost noted above. Moreover, the cycle efficiency is raised from the 37% possible with a system utilizing only 1200 p.s.i. steam to approximately 42%. This increase in efficiency is derived from the more efficient utilization of the heat availability of the high temperature steam leaving the reactor. In the reactor sytems of the prior art, utilizing a Loeffler cycle, the high heat availability of the steam was used only to vaporize the reactor inlet coolant and was degraded from approximately 1050° F. to 600° F. without producing any of the work possible by the expansion thereof. Conversely, the high temperature reactor outlet steam in the present system is efficiently utilized to heat the supercritical pressure fluid which may be more efficiently expanded than would be the 1200 p.s.i. steam. Accordingly, the heat availability of the coolant in the present reactor system is more efficiently utilized, substantially increasing the overall system efficiency.

A particular example of a reactor system incorporating the present invention could operate at the conditions set forth in Table I.

*Table I*

Reactor coolant (steam):
    Reactor output _____ 2500 mw. thermal.
    Reactor coolant flow _____ 24.45×10⁶ lbs./hr.
    Reactor inlet pressure _____ 1260 p.s.i.
    Reactor inlet temperature _____ Saturated vapor.
    Reactor outlet pressure _____ 1140 p.s.i.
    Reactor outlet temperature ___ 1050° F.

Heat exchanger:
    Primary portion—
        Flow _____ 17.25×10⁶ lbs./hr.
        Inlet temperature _____ 1050° F.
        Inlet pressure _____ 1140 p.s.i.
        Outlet temperature _____ 660° F.
        Outlet pressure _____ 1090 p.s.i.

Secondary portion—
        Flow _____ 6.16×10⁶ lbs./hr.
        Inlet temperature _____ 600° F.
        Inlet pressure _____ 6000 p.s.i.
        Outlet temperature _____ 930° F.
        Outlet pressure _____ 5500 p.s.i.

*Table I—Continued*

Low pressure turbine:
    Flow _____ 7.2×10⁶ lbs./hr.
    Output _____ 950 mw.

High pressure turbine:
    Flow _____ 6.16×10⁶ lbs./hr.
    Output _____ 200 mw.
    Outlet pressure _____ 1300 p.s.i.
    Quality _____ 3% moisture.

It should be noted that line 46 which may introduce a small portion of the feedwater from heater 38 into the inlet of the main circulating pump 40 reduces the specific volume of fluid being pumped and thus reduces the pumping power required. This is true because most pumps are more efficient when pumping denser fluids.

An alternate arrangement of the present invention could utilize a system without the steam drum 30. In such a system, high pressure pump 28 would be supplied directly with a portion of the feedwater from heater 38, necessitating a slightly larger heat exchanger 18. The reactor inlet coolant would then be supplied directly from the mixing T 39 in the high pressure turbine outlet line 32.

However, the preferred embodiment of the present invention incorporates steam drum 30 which operates to remove radioactive products from the recirculated steam and which provides a coolant reservoir to reduce the rate of system depressurization in the event of a rupture in the system piping. Furthermore, the stream drum assists in stabilizing the reactor coolant inlet conditions and assures that the inlet coolant is saturated vapor.

I claim:
1. A nuclear reactor system comprising a nuclear reactor, means for circulating a coolant fluid through said reactor at a first pressure, a first turbine operating at said first pressure, a second turbine operating at a pressure higher than said first turbine, heat transfer means arranged to transfer heat from a portion of the heated reactor coolant fluid to a second fluid at a pressure higher than the pressure of the reactor coolant fluid, means connecting said reactor outlet to the inlet of said first turbine for passing the remaining portion of the heated reactor coolant therethrough, means for passing said second heated fluid to said second turbine, said circulating means arranged to return the coolant fluid from said heat transfer means to said reactor, and means connecting the outlets of said turbines to said reactor.

2. A nuclear reactor system comprising a nuclear reactor, means for circulating a coolant fluid through said reactor at a subcritical pressure, a first turbine operating at said subcritical pressure, a second turbine operating at a supercritical pressure, heat transfer means arranged to transfer heat from a portion of the heated reactor coolant fluid to a second fluid at a supercritical pressure, means connecting said reactor outlet to the inlet of said first turbine for passing the remaining portion of the heated reactor coolant therethrough, means for passing said heated supercritical fluid to said second turbine, said circulating means arranged to return the coolant fluid from said heat transfer means to said reactor, and means connecting the outlets of said turbines to said reactor.

3. A nuclear reactor system comprising a nuclear reactor, means for circulating a coolant fluid through said reactor at a subcritical pressure, a first turbine operating at said subcritical pressure, a second turbine operating at a supercritical pressure, heat transfer means arranged to transfer heat from a portion of the heated reactor coolant fluid to a second fluid at a supercritical pressure, means connecting said reactor outlet to the inlet of said first turbine for passing the remaining portion of the heated reactor coolant therethrough, means for condensing the fluid leaving said first turbine, means for passing said heated supercritical fluid to said second turbine, said circulating means arranged to return the coolant fluid from said heat transfer means to said reactor, and means for mixing the reactor coolant fluid leaving said heat transfer means with fluid from said condensing means to vaporize said condensed fluid.

4. A nuclear reactor system comprising a nuclear reactor having a coolant inlet and outlet, means for circulating a coolant fluid through said reactor at a first pressure, a first turbine operating at said first pressure, a second turbine operating at a pressure higher than said first turbine, a heat exchanger having a primary and a secondary portion, means connecting said reactor outlet to the inlet of the primary portion of said heat exchanger for passing a portion of the heated reactor coolant therethrough, means connecting said reactor outlet to the inlet of said first turbine for passing the remaining portion of the heated reactor coolant therethrough, means for passing a fluid at a pressure higher than said reactor coolant through said secondary portion of said second heat exchanger to be heated by said reactor coolant flowing in the primary portion thereof, means connecting the outlet of said secondary portion of said heat exchanger to the inlet of said second turbine, said circulating means arranged to return the fluid from said primary portion of said heat exchanger to said reactor, means connecting the outlet of said second turbine to said reactor, and means for mixing the outlet of said first turbine with said fluid from the primary portion of said heat exchanger and said second turbine.

5. A nuclear reactor system comprising a nuclear reactor having a coolant inlet and outlet, means for circulating a coolant fluid through said reactor at a first pressure, a first turbine operating at said first pressure, a second turbine operating at a pressure higher than said first turbine, a heat exchanger having a primary and a secondary portion, means connecting said reactor outlet to the inlet of the primary portion of said heat exchanger for passing a portion of the heated reactor coolant therethrough, means connecting said reactor outlet to the inlet of said first turbine for passing the remaining portion of the heated reactor coolant therethrough, means for passing a fluid at a pressure higher than said reactor coolant through said secondary portion of said second heat exchanger to be heated by said reactor coolant flowing in the primary portion thereof, means connecting the outlet of said secondary portion of said heat exchanger to the inlet of said second turbine, a vapor-liquid separating vessel connected to the inlet of said reactor, said circulating means arranged to return the fluid from said primary portion of said heat exchanger to said separating vessel, means connecting the outlet of said second turbine to said separating vessel, and means for mixing the outlet of said first turbine with said fluid entering said separating vessel.

6. A nuclear reactor system comprising a nuclear reactor having a coolant inlet and outlet, means for circulating a coolant fluid through said reactor at a subcritical pressure, a first turbine operating at said subcritical pressure, a second turbine operating at a supercritical pressure, a heat exchanger having a primary and a secondary portion, means connecting said reactor outlet to the inlet of the primary portion of said heat exchanger for passing a portion of the heated reactor coolant therethrough, means connecting said reactor outlet to the inlet of said first turbine for passing the remaining portion of the heated reactor coolant therethrough, means for passing a fluid at a supercritical pressure through said secondary portion of said second heat exchanger to be heated by said reactor coolant flowing in the primary portion thereof, means connecting the outlet of said secondary portion of said heat exchanger to the inlet of said second turbine, a vapor-liquid separating vessel connected to the inlet of said reactor, said circulating means arranged to return the fluid from said primary portion of said heat exchanger to said separating vessel, means connecting the outlet of said second turbine to said separating vessel, and means for mixing the outlet of said first turbine with said fluid entering said separating vessel.

7. A nuclear reactor system comprising a nuclear reactor having a coolant inlet and outlet, means for circulating a coolant fluid through said reactor at a subcritical pressure, a first turbine operating at said subcritical pressure, a second turbine operating at supercritical pressure, a heat exchanger having a primary and a secondary portion, means connecting said reactor outlet to the inlet of the primary portion of said heat exchanger for passing a portion of the heated reactor coolant therethrough, means connecting said reactor outlet to the inlet of said first turbine for passing the remaining portion of the heated reactor coolant therethrough, means for condensing the fluid leaving said first turbine, means for passing a fluid at a supercritical pressure through said secondary portion of said second heat exchanger to be heated by said reactor coolant flowing in the primary portion thereof, means connecting the outlet of said secondary portion of said heat exchanger to the inlet of said second turbine, a vapor-liquid separating vessel connected to the inlet of said reactor, said circulating means arranged to return the fluid from said primary portion of said heat exchanger to said vapor-liquid separating vessel, means for mixing the fluid leaving the primary portion of said heat exchanger with fluid from said condensing means to vaporize said condensed fluid, and means connecting the outlet of said second turbine to said separating vessel.

8. A nuclear reactor system comprising a nuclear reactor having a coolant inlet and outlet, means for circulating a coolant fluid through said reactor at a subcritical pressure, a first turbine operating at said subcritical pressure, a second turbine operating at supercritical pressure, a heat exchanger having a primary and a secondary portion, means connecting said reactor outlet to the inlet of the primary portion of said heat exchanger for passing a portion of the heated reactor coolant therethrough, means connecting said reactor outlet to the inlet of said first turbine for passing the remaining portion of the heated reactor coolant therethrough, means for condensing the fluid leaving said first turbine, means for passing a fluid at a supercritical pressure through said secondary portion of said second heat exchanger to be heated by said reactor coolant flowing in the primary portion thereof, means connecting the outlet of said secondary portion of said heat exchanger to the inlet of said second turbine, a vapor-liquid separating vessel connected to the inlet of said reactor, said circulating means arranged to return the fluid from said primary portion of said heat exchanger to said separating vessel, means for mixing the fluid leaving the primary portion of said heat exchanger with fluid from said condensing means to vaporize said condensed fluid, means connecting the outlet of said second turbine to said separating vessel, and means for introducing a portion of said fluid from said condensing means into the inlet of said circulating means.

9. A nuclear reactor system comprising a nuclear reactor having a coolant inlet and outlet, means for circulating a steam as a coolant fluid through said reactor at a subcritical pressure, a first turbine operating at said subcritical pressure, a second turbine operating at supercritical pressure, a heat exchanger having a primary and a secondary portion, means connecting said reactor outlet to the inlet of the primary portion of said heat exchanger for passing a portion of the heated reactor coolant therethrough, means connecting said reactor outlet to the inlet of said first turbine for passing the remaining portion of the heated reactor coolant therethrough, means for condensing the fluid leaving said first turbine, means for passing steam at supercritical pressure through said secondary portion of said second heat exchanger to be heated by said reactor coolant flowing in the primary portion thereof, means connecting the outlet of said secondary portion of said heat exchanger to the inlet of said second turbine, a steam drum connected to the inlet of said reactor, said circulating means arranged to return the fluid from said primary portion of said heat exchanger to said steam drum, means for mixing the fluid leaving the primary portion of said heat exchanger with fluid from said condensing means to vaporize said condensed fluid, means connecting the outlet of said second turbine to said steam drum, and means for introducing a portion of said fluid from said condensing means into the inlet of said circulating means.

10. The method of operating a nuclear reactor system having a nuclear reactor, a first turbine operating at a first pressure, a second turbine operating at a pressure higher than said first turbine, and heat transfer means, comprising the steps of circulating a coolant fluid at a first pressure through said reactor to remove heat therefrom, passing a portion of said heated reactor coolant fluid through said heat transfer means and transferring heat to a second fluid at a pressure higher than the pressure of the reactor coolant fluid, passing the remaining portion of the heated reactor coolant through said first turbine, passing said second heated fluid through said second turbine, returning the coolant fluid from said heat transfer means to said reactor, and returning the fluid from said second turbine to said reactor.

11. The method of operating a nuclear reactor system having a nuclear reactor, a first turbine operating at a first pressure, a second turbine operating at a pressure higher than said first turbine, and heat transfer means, comprising the steps of circulating a coolant fluid at a first pressure through said reactor to remove heat therefrom, passing a portion of said heated reactor coolant fluid through said heat transfer means and transferring heat to a second fluid at a pressure higher than the pressure of the reactor coolant fluid, passing the remaining portion of the heated reactor coolant through said first turbine, passing said second heated fluid through said second turbine, mixing the coolant fluid from said heat transfer means with the fluid from said first turbine, returning the mixed fluid to said reactor, and returning the fluid from said second turbine to said reactor.

12. The method of operating a nuclear reactor system having a nuclear reactor, a first turbine operating at a first pressure, a second turbine operating at a pressure higher than said first turbine, and heat transfer means, comprising the steps of circulating a coolant vapor at a first pressure through said reactor to remove heat therefrom, passing a portion of said heated reactor coolant vapor through said heat transfer means and transferring heat to a second fluid at a pressure higher than the pressure of the reactor coolant vapor, passing the remaining portion of the heated reactor coolant through said first turbine, condensing the coolant leaving said first turbine, passing said second heated fluid through said second turbine, mixing the condensed coolant fluid from said first turbine with coolant vapor from said heat exchange means to vaporize said condensed coolant, returning the mixed fluid to said reactor, and returning the fluid from said second turbine to said reactor.

13. The method of operating a nuclear reactor system comprising a nuclear reactor having a coolant inlet and outlet, a first turbine operating at said subcritical pressure, a second turbine operating at supercritical pressure, a vapor-liquid separating vessel, a heat exchanger having a primary and a secondary portion, comprising the steps of circulating a coolant fluid through said reactor at a subcritical pressure, passing a portion of the heated reactor coolant through the primary portion of said heat exchanger, passing the remaining portion of the heated reactor coolant through said first turbine, condensing the fluid leaving said first turbine, passing a fluid at a supercritical pressure through said secondary portion of said second heat exchanger to be heated by said reactor coolant flowing in the primary portion thereof, circulating said heated supercritical fluid from said secondary portion of said heat exchanger through said second turbine, mixing the fluid leaving the primary portion of said heat exchanger with fluid from said condensing means to vaporize said condensed fluid, returning the fluid from said primary portion of said heat exchanger to said separating vessel, and returning the fluid from said second turbine to said separating vessel.

14. The method of operating a nuclear reactor system comprising a nuclear reactor having a coolant inlet and outlet, a first turbine operating at said subcritical pressure, a second turbine operating at supercritical pressure, a vapor-liquid separating vessel, a heat exchanger having a primary and a secondary portion, comprising the steps of circulating steam through said reactor at a subcritical pressure, passing a portion of the heated reactor coolant steam through the primary portion of said heat exchanger, passing the remaining portion of the heated reactor coolant steam through said first turbine, condensing the steam leaving said first turbine, passing water at a supercritical pressure through said secondary portion of said second heat exchanger to be heated by said reactor coolant steam flowing in the primary portion thereof, circulating said heated supercritical steam from said secondary portion of said heat exchanger through said second turbine, mixing the steam leaving the primary portion of said heat exchanger with water from said condensing means to vaporize said water, returning the steam from said primary portion of said heat exchanger to said separating vessel, and returning the fluid from said second turbine to said separating vessel.

References Cited by the Examiner

UNITED STATES PATENTS

| | | | |
|---|---|---|---|
| 3,047,479 | 6/1962 | Young | 176—60 X |
| 3,108,938 | 10/1963 | Nettel et al. | 176—60 X |
| 3,161,572 | 12/1964 | Kagi | 176—60 X |
| 3,175,953 | 3/1965 | Nettel et al. | 176—60 |
| 3,210,943 | 10/1965 | Acklin | 176—60 X |
| 3,242,053 | 3/1966 | Sanders et al. | 176—60 |
| 3,244,598 | 4/1966 | Rose et al. | 176—60 |

REUBEN EPSTEIN, *Primary Examiner.*